United States Patent [19]

Zellweger

[11] Patent Number: 4,625,935

[45] Date of Patent: Dec. 2, 1986

[54] ADJUSTABLE-HEIGHT SUPPORT FOR ROTARY EVAPORATORS

[75] Inventor: Adolf Zellweger, Gossau, Switzerland

[73] Assignee: Büchi Laboratoriums-Technik AG, Flawil, Switzerland

[21] Appl. No.: 677,853

[22] Filed: Dec. 4, 1984

[30] Foreign Application Priority Data

Dec. 9, 1983 [CH] Switzerland .................. 6597/83

[51] Int. Cl.⁴ .............................................. E04G 3/00
[52] U.S. Cl. .................................. 248/297.1; 267/177
[58] Field of Search ............... 248/297.1, 295.1, 125, 248/161, 157, 594, 618, 624, 162.1; 267/177, 175

[56] References Cited

U.S. PATENT DOCUMENTS

| | | | |
|---|---|---|---|
| 1,431,954 | 10/1922 | Holy | 267/177 X |
| 2,620,413 | 12/1952 | Johnson | 267/175 X |
| 2,940,718 | 6/1960 | Beal | 248/297.2 X |
| 2,961,260 | 11/1960 | Newlin | 248/161 X |
| 3,014,682 | 12/1961 | Veneman | 248/161 |
| 3,790,119 | 2/1974 | Bauer | 248/161 X |
| 4,333,391 | 6/1982 | Nash | 267/177 X |
| 4,457,501 | 7/1984 | Davis | 267/175 X |
| 4,526,334 | 7/1985 | Rantakari | 248/157 |
| 4,543,988 | 10/1985 | Huveteau | 267/177 X |

FOREIGN PATENT DOCUMENTS 2649950 12/1977 Fed. Rep. of Germany .
2758433 5/1979 Fed. Rep. of Germany .
2129321 5/1984 United Kingdom .

OTHER PUBLICATIONS

Technische Informationen Nr. 5/82 of QVF Glastechnik GmbH (date unknown).

Primary Examiner—Ramon O. Ramirez
Attorney, Agent, or Firm—William R. Hinds

[57] ABSTRACT

The support has a base plate in which a rod is secured in a vertical position. A holder device can be moved up and down on the rod. An energy storage means in the form of a spring means, which is disposed beside the rod, is connected to a cable drum. A cable leads from the cable drum to the holder device by way of direction-changing rollers. Thus, force from the energy storage means is available for the upward movement of the holder device. The spring means in the energy storage means is put under tension again when the holder device is moved downwardly. The energy storage means has an adjusting means for prestressing the spring means. The energy storage means, being disposed outside the rod, makes it possible in a very simple manner to intervene in the force potential of the energy storage means with an additional drive means.

11 Claims, 9 Drawing Figures

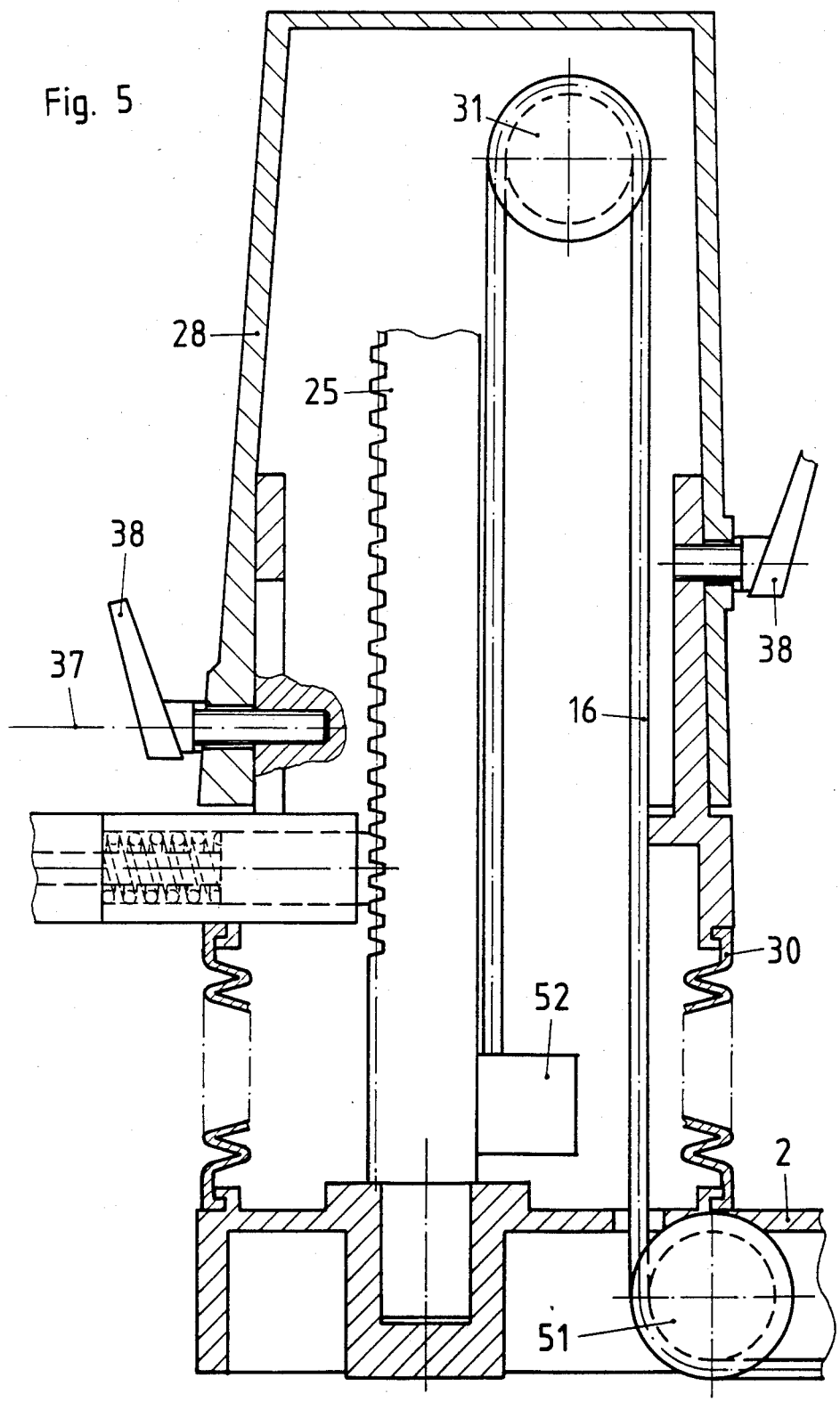

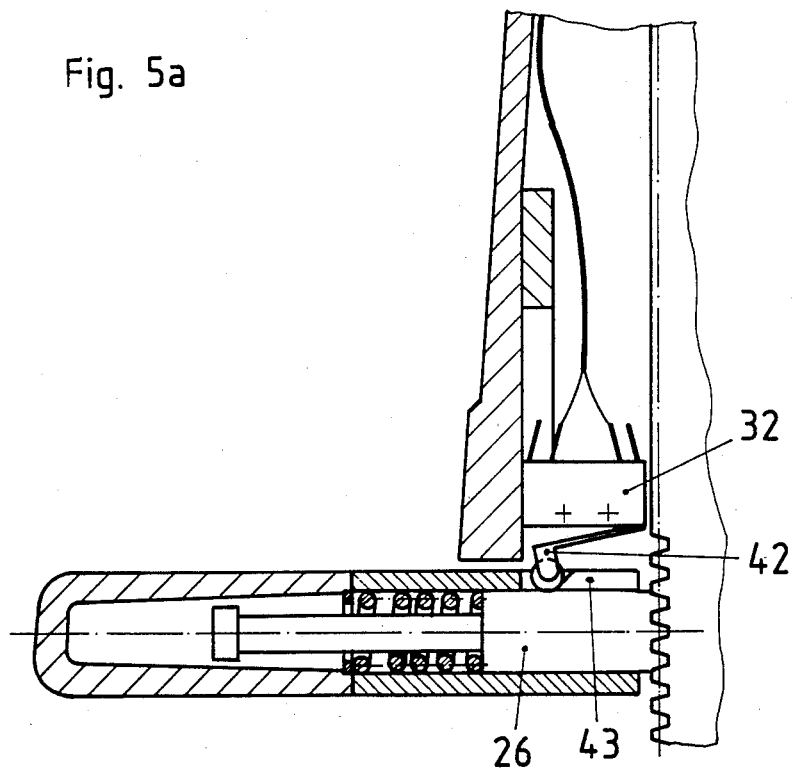

ADJUSTABLE-HEIGHT SUPPORT FOR ROTARY EVAPORATORS

BACKGROUND OF INVENTION

The invention relates to an adjustable-height support particularly for rotary evaporators, comprising a base plate and a holder device for securing a glass unit and a drive unit or the like, the holder device being displaceable along a substantially vertical rod and being lockable thereon by an arresting means.

Supports of that kind, which are also referred to as quick-lift devices, can be used for example to hold an evaporator flask in a water bath. As the evaporation operation can only be stopped by rapidly lifting the flask out of the heating bath, it is desirable for the support to be quickly and easily adjusted. The support must also be capable of performing various pivotal movements in order on the one hand to be able to adjust the setting of the support to the respective dimensions of the glass unit and on the other hand to facilitate manipulation operation with the glass unit and the chemicals contained therein. Finally, besides a robust construction, it would also be desirable for the lifting and lowering movements of the support to be motorized as that permits automatic control of the evaporation operation by way of a timing circuit.

DESCRIPTION OF PRIOR ART

However, motorized drive for the support movement, with at the same time the option of manual operation, represent partly conflicting requirements which have not been satisfactorily resolved in the previously known supports. Thus for example most supports permit only manual operation, while generally adjustment in respect of height of the holder device cannot be performed with one hand as either the glass unit secured to the holder device is too heavy or the holder device has to be held with one hand while a fixing screw or the like is released with the other hand. In addition, the previously known supports do not take account of the different weights of the glass units which can be gripped on the holder device. Japanese utility model publication No. 145501/1982 discloses for example a support which is adjustable in respect of height by a motor drive, wherein an electric motor rotates a screwthreaded spindle which is disposed in the interior of the rod of the support. The rod itself is secured against rotary movement by means of a longitudinal guide so that the rod is raised or lowered, upon rotation of the screwthreaded spindle, depending on the direction of rotary movement thereof. However, that arrangement suffers from the disadvantage that there is no possibility whatever of manual operation. If for example in the event of a delay in boiling in the evaporator flask, immediate interruption in the supply of heat is required, the rod of the support must be raised by the motor drive, which however takes much too long by means of the screw threaded spindle, so that there is the danger of explosion. Another disadvantage is that for example in the event of a power failure, the holder device can no longer be moved at all and for example in an automatic operation the evaporator flask remains immersed in the heating bath which however cools down only very slowly.

SUMMARY OF INVENTION

An object of the present invention is therefore to provide a support of the kind set forth in the opening part of this specification, which is quick and easy to operate and wherein account can be taken of the different weights of the glass units to be secured to the support.

A further object of the invention is to permit fully automatic control of the movements of the support, without detrimentally affecting the possibility of manual operation.

Finally, the invention seeks to provide that the support also has maximum operating safety in emergency situations.

In accordance with the invention, those objects are achieved by a support characterised in that the holder device is connected to a mechanical energy storage means in such a way that, when the arresting means is released the holder device is displaceable downwardly against the force of the energy storage means or can be raised with the assistance of the energy storage means, and that the energy storage means has an adjusting means for adjusting the potential energy that can be stored. The mechanical energy storage means provides, in a very simple manner, a force which lifts the holder device and thus raises the evaporator flask out of the heating bath. In order to produce such movement, it is only necessary to release the arresting means, and that can clearly be done by a single handle. Adjustment of the potential energy which can be stored in the energy storage means permits the force to be applied for lifting the holder device to be matched to the respective weight of the glass unit so that, when the arresting means is released, the holder device is always lifted approximately with the same amount of force. It will be appreciated that the adjusting device also makes it possible to provide for a condition of equilibrium between the weight of the glass unit and the force of the energy storage means.

The arrangement according to the invention may be embodied in a particularly simple manner if the energy storage means is a spring means disposed beside the rod of the support. It is known that spring means are excellent energy storage means for such purposes, and can be installed in a relatively compact fashion. Arranging the spring means beside the support rod member permits on the one hand an advantageous structural configuration of the rod member and the holder device, such as in particular permitting the apparatus to be of low height. On the other hand however, that arrangement also permits the connection of the drive means which intervenes in the force potential of the energy storage means directly at said energy storage means, as will also be shown hereinafter. It will be appreciated that instead of the spring means, it would also be possible to use another mechanical energy storage means such as for example a pneumatic energy storage means or a counterweight.

A particularly advantageous form of coupling between the holder device and the energy storage means can be achieved if the holder device is connected to the energy storage means by way of a cable. The cable is compact, inexpensive and can therefore be disposed in such a fashion as to be invisible from the outside, in a very simple manner. The direction of the force applied can be altered in a very simple manner by way of direction-changing rollers, in which respect only low frictional losses have to be tolerated. It will be appreciated that it would also be possible, instead of the cable, to use a linkage or a transmission arrangement for the transmission of forces.

The construction may be further improved by the spring means being force-lockingly connected to a cable drum for winding on the cable. In itself, the cable movement could also be taken up by a lever arm of sufficient magnitude. However, a cable drum has the advantage that it takes up less space and that further accessories such as brakes, locking pawls, teeth etc. can be provided thereon.

Depending on the desired force potential and the distance that the holder device must cover at the rod of the support, the spring mean may be either a spiral spring or a cylindrical coil spring with legs (leg spring). In both types of spring, the force may be transmitted to a spindle or shaft in a very simple manner. Springs with a suitable spring characteristic are already commercially available and only have to be installed in a suitable fashion. It will be appreciated however that, depending on the situation of use, other spring means would also be possible, such as for example straight bending springs, torsion springs, diaphragm springs and the like.

The spring means may be adjusted in a particularly simple fashion if the spring means is disposed in a housing which at one end has a tooth arrangement and if the adjusting means is a spring plate which is provided with a corresponding tooth arrangement and which can be pressed against the tooth arrangement on the housing, by means of a setting device for adjusting the coil spring, in various positions. It will be seen that the spring means can be prestressed by means of the spring plate, while the weight of the glass unit secured to the holder device can be taken into consideration. A scale may be provided on the housing or on the spring plate, to facilitate adjustment of the spring means and to indicate the extent to which the spring means is prestressed.

If the cable drum is connected to a disengageable drive means for motorized displacement of the holder device when the arresting means is in the released position, the support according to the invention may be operated in a very simple manner both manually and also automatically. When the drive means is connected in, it performs the same movement at the cable drum, as that which occurs in the manual mode of operation. In that connection, the drive means is relieved of load when the holder device is lifted by the spring means. In a particularly simple fashion, a tooth arrangement may be provided directly on the cable drum, the drive means or the transmission means thereof force-lockingly engaging into the tooth arrangement on the cable drum. It will be appreciated however that it would also be possible to provide a frictional force transmission effect by means of friction wheels or belts.

A particularly advantageous form of mounting and fixing the holder device on the rod of the support is achieved if, for arresting the holder device, a toothed rack is arranged in parallel relationship between the rod of the support, the holder device having a locking pawl which can engage into the rack. In that way, the mounting and the arresting of the holder device are separated from each other so that the holder device may be mounted on a precise, cylindrically ground rod by means of ball bearing bushes. That gives particularly advantageous qualities in regard to movement thereof, while the rack with the locking pawl engageable therewith ensures a reliable arresting action. That arrangement thus ensures sufficiently fine adjustability, depending on the number of teeth on the rack. The mounting structure may be further improved by a guide member being disposed in parallel relationship beside the rod of the support as a means for preventing rotary movement, the holder device being supported against the guide member to resist rotary moments about the axis of the rod. In comparison with a means for preventing rotary movement by longitudinal guide means on the rod itself, the above-indicated arrangement has the advantage that the friction which occurs when rotary moments are produced, at the guide means, can be reduced by the lever arm between the rod of the support and the guide rod.

The guide and arresting elements can be protected from external influences and fouling in a particularly simple manner if the holder device has a casing which encloses the rod of the support, the toothed rack and the guide member, with a bellows or concertina-like member which is connected to the base plate being disposed at the lower edge of the casing. The bellows or concertina-like member bridges over the relative movement as between the casing and the base plate and also prevents objects being able to get into that region, which would block the holder device in the lowering movement.

The casing also has the advantage that it can accommodate the cable which extends in the plane of the base plate, in such a way that the cable cannot be seen, and protects the cable from mechanical and chemical influences from the exterior.

If the locking pawl on the holder device is connected to a switching means which switches off the drive means at the cable drum when the pawl is in the engaged condition, that arrangement reliably ensures that the drive means cannot be operated by mistake in the manual mode. If the locking pawl is disengageable with a release lever which is secured to a handle and if the release lever can be locked with a flap which pivots away when the release lever is gripped and which is so connected to a switching means that, when the flap member is pivoted away, the drive means is disconnected, the operator can intervene directly in the automatic mode of operation, without further actions. That is particularly advantageous if for example in an emergency, with the apparatus operating in the automatic mode, the evaporator flask has to be immediately lifted out of the bath. That can be done by means of the switching device on the flap member without the drive means having to be separately switched off or disconnected, before the lifting movement.

It is also particularly advantageous in regard to emergency situations if the drive means at the cable drum is an electric motor which is so coupled to the cable drum that the cable drum is freely rotatable in the event of power failure. If by mistake anyone switches off the power in the automatic mode or if for example there is an interruption in power when the operator is absent, the cable drum can rotate freely as the arresting means is in the disengaged condition. By means of suitable adjustment at the spring means, that can provide that the evaporator flask can always be lifted out of the heating bath, in a situation of that nature, an electromagnetic clutch for example could be used as a suitable form of coupling means.

The operating safety and controllability of the support may be further enhanced by an adjustable position switch being disposed between the casing and the base plate, which switch selectively switches off the drive means at the cable drum or reverses the direction of rotation thereof, when a lower and/or upper limit position of the casing or the holder device is reached. In that way, the limit positions can be set in a particularly simple fashion. On the other hand, in the automatic mode, that arrangement also permits a continuous upward and downward oscillating movement of the holder device, which may be desirable in certain situations.

If the holder device is pivotal about an axis which extends transversely with respect to the rod of the support, it is also possible for small glass flasks to be dipped into the water bath to an adequate depth. Even if the support is used for purposes other than for rotary evaporators, universal displaceability is a desirable consideration.

BRIEF DESCRIPTION OF DRAWINGS

An embodiment of the invention is described in greater detail hereinafter and illustrated in the drawings, in which:

FIG. 5 shows a view in longitudinal section through the lifting device, taken along line C—C in FIG. 3;

FIG. 5a shows the switching means on the locking pawl;

DESCRIPTION OF PREFERRED FEATURES

Figure 1:
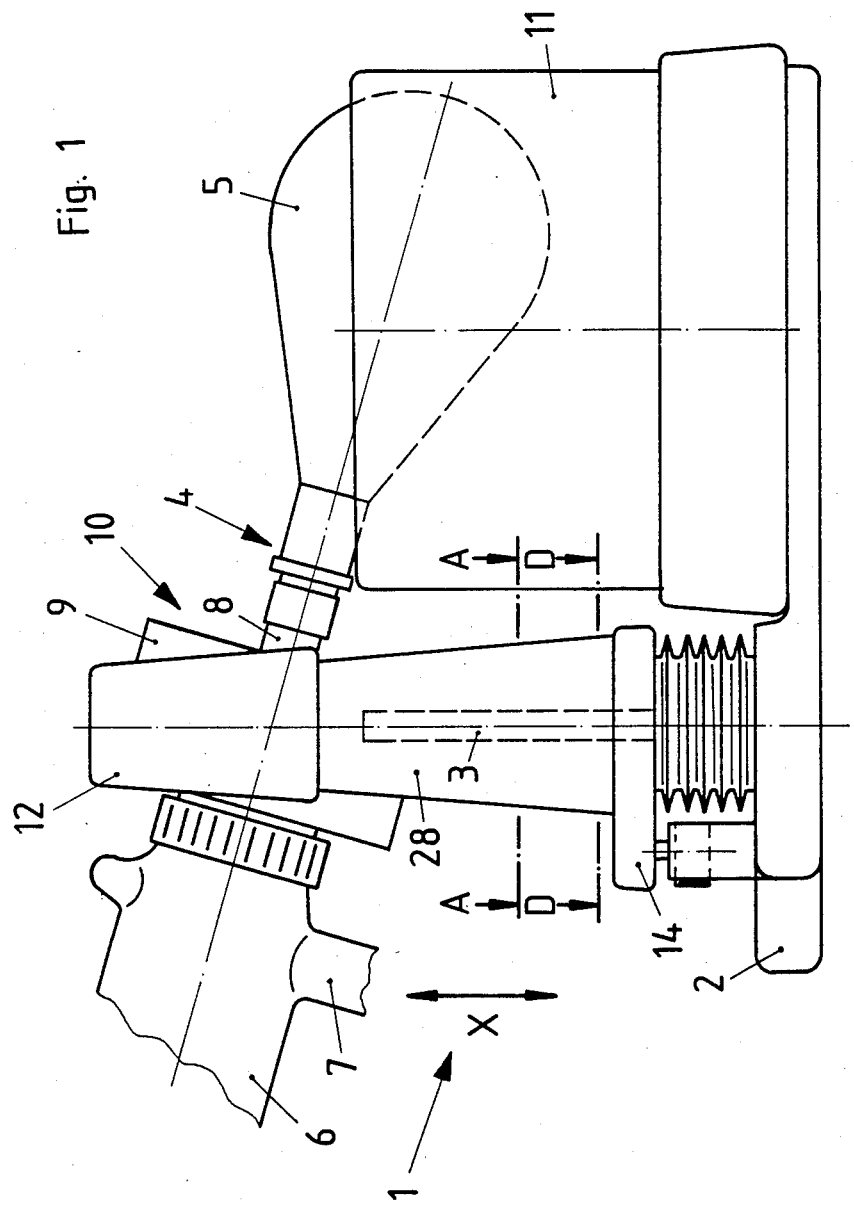
FIG. 1 is a side view of the apparatus according to the invention, with a glass unit secured to the holder device, and with a heating bath.

As shown in highly simplified diagrammatic form in FIG. 1, the support 1 comprises a base plate 2 on which is disposed a support rod 3 which, in the illustrated embodiment, is not visible but is masked by a casing 28. A glass unit 4 and a drive unit 9 are secured to a holder device 10 which can be raised and lowered along the rod 3 in the direction indicated by the arrow X. The glass unit 4 comprises a flask 5 which is connected by way of a vapour carrier tube 8 to a cooler 6 of which only part is shown. The distillate collecting flask is generally secured to a distillate outlet 7 of the cooler, although the distillate flask is not shown in the drawing. The drive unit 9 causes the glass unit 4 to rotate in known fashion. The drive unit 9 and the glass unit 4 are per se known components and are therefore not described in greater detail herein and are not shown in the other Figures of drawings. The flask 5 is immersed in a water bath 11 which can be disposed on the base plate 2, as a separate structural unit.

The holder device 10 has a casing 28 which surrounds the rod or bar 3. A control unit 12 which can be integrated into the holder device 10 monitors the function of the drive unit 9 for rotary movement of the glass unit 4.

Figure 2:
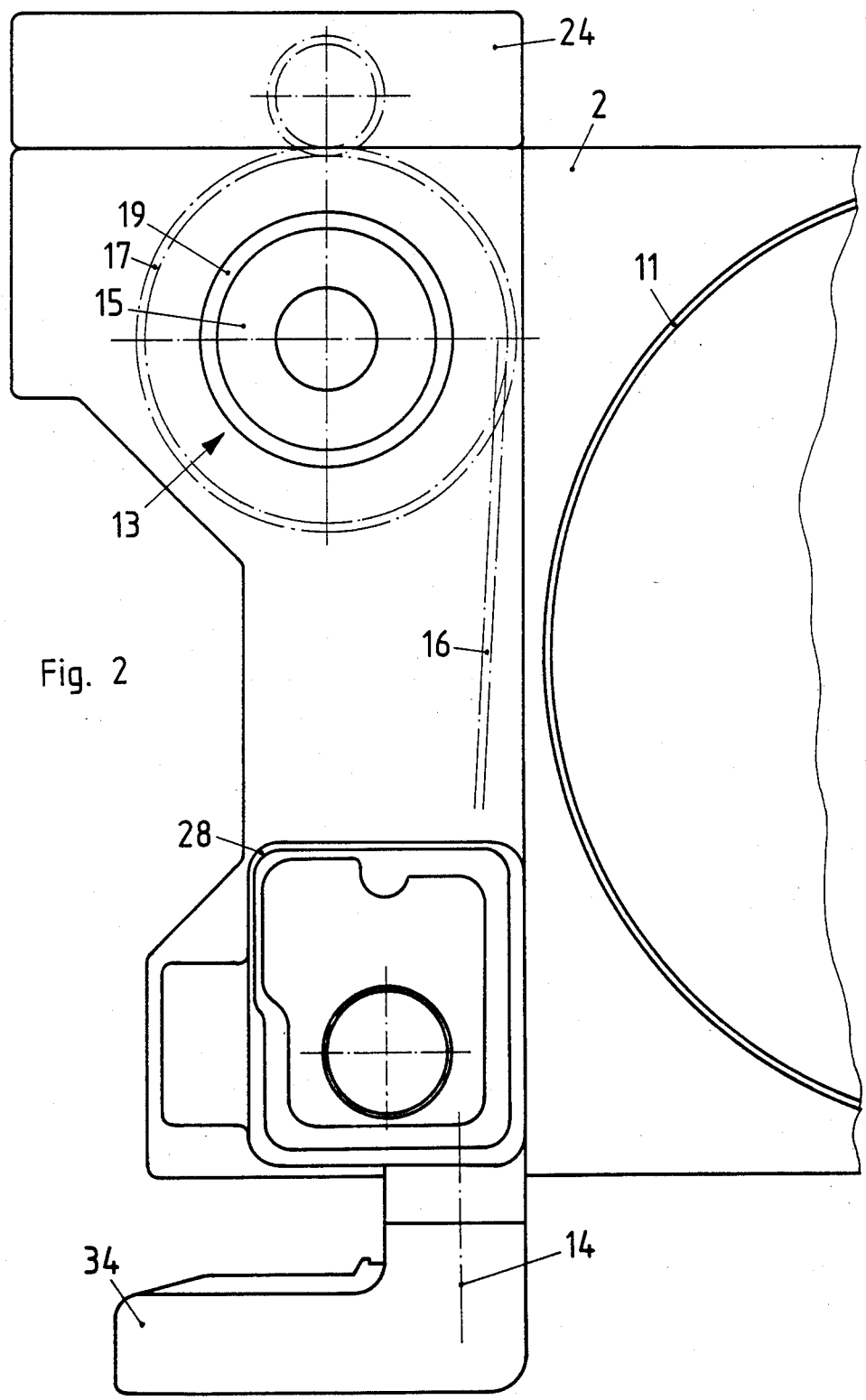
FIG. 2 shows a plan view of the apparatus shown in FIG. 1 in highly simplified form, with only a part of the holder devcie being shown, and without a glass unit.

FIG. 2 shows an energy storage means 13 which is disposed beside the rod or bar 3. The energy storage means 13 is disposed in a housing 19 on the base plate 2. A cable drum 17 and a cable 16 which connects the energy storage means 13 to the holder device 10 or to the casing 28 thereof are indicated, being invisible beneath the base plate. Disposed directly behind the energy storage means 13, in the form of a separate component, is a drive means 24 which can be connected to the housing 2 for automatic operation of the support in a suitable manner.

An arresting means 14 comprises a handle 34 and a locking pawl which cannot be seen in FIG. 2 but which will be described hereinafter.

Figure 3:
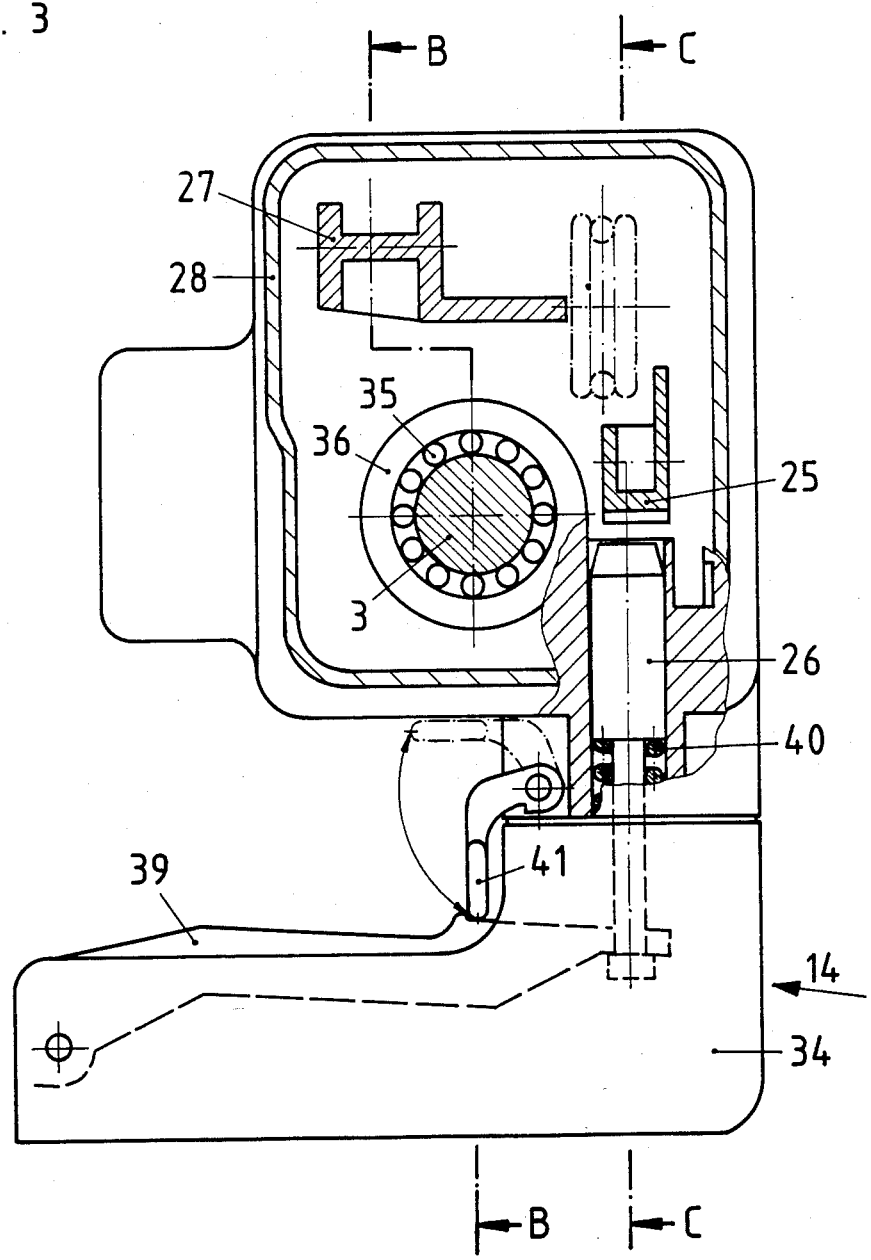
FIG. 3 shows a view in cross-section through the holder device taken along line A—A in FIG. 1.
Figure 4:
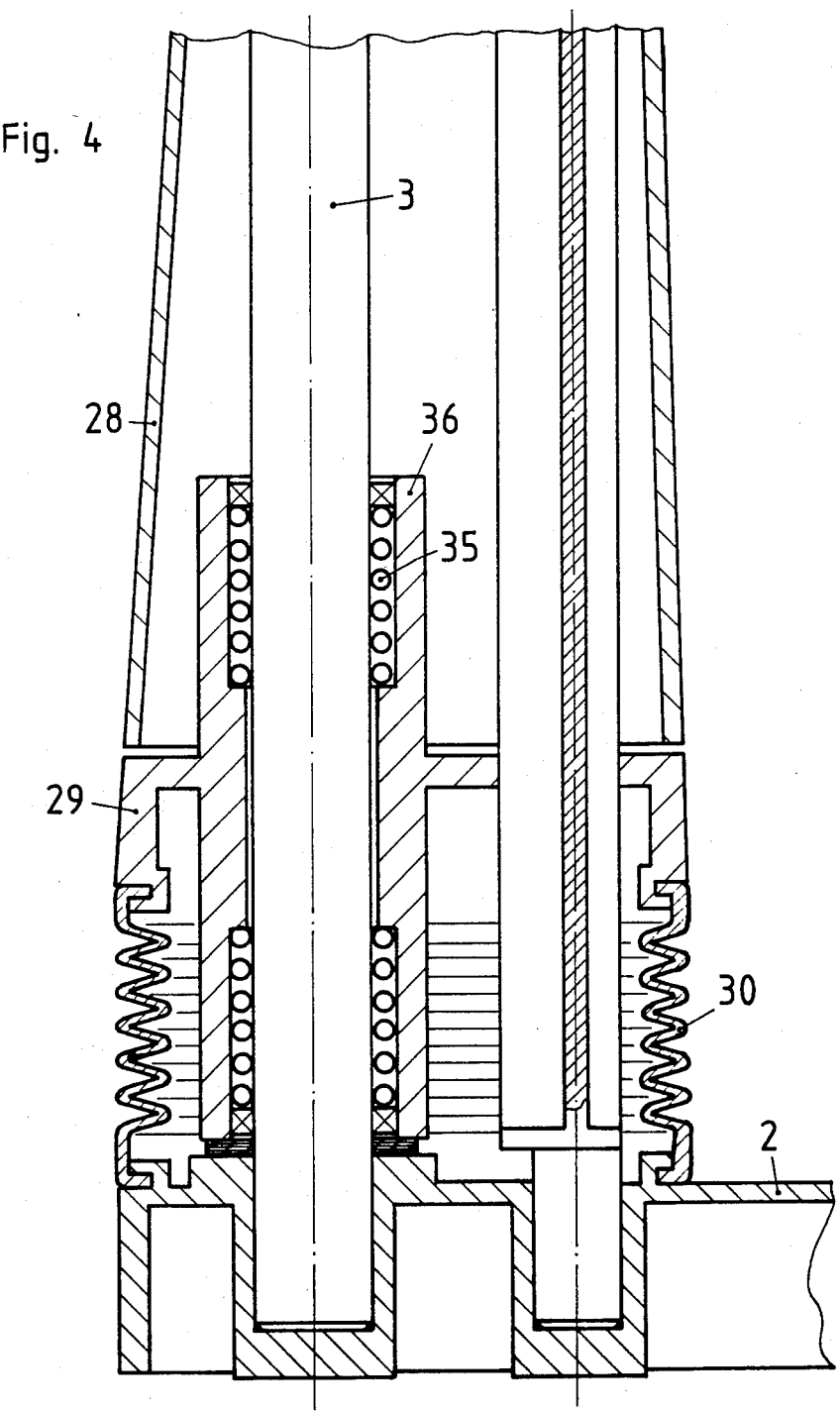
FIG. 4 shows a view in longitudinal section through the entire lifting device, taken along line B—B in FIG. 3.

After the foregoing general review of the individual components, the precise mode of operation and construction will now be described, with reference to various particular views, as shown in particular in FIGS. 3 and 4, the rod 3 is fixed to the base plate 2 in a vertical position. The rod 3 is surrounded by a case or sheath 36 which on the one hand carries the casing 28 and on the other hand accommodates ball bearing bushes 35 so that the case 36 together with the casing 28 and the entire holder device is displaceable with minimum friction along the rod 3. As will be seen from FIG. 5, the casing 28 is not rigidly connected to the case 36 but is tiltable about a tilting axis 37 so that the entire casing with the holder device may be disposed in an inclined position, with respect to the water bath. The casing 28 can be fixed within a given sector by means of arresting levers 38.

Disposed at the lower edge 29 of the casing is a folding bellows or concertina-like member 30 which is connected to the base plate 2. In the illustrated embodiment, the lower edge 29 of the casing is formed by a projecting portion of the case 36 as in this case only the case 36 is always displaced with its axis in parallel relationship with respect to the rod 3. It will be seen that the member 30 closes off the space between the lower edge 29 and the base plate 2, in any relative position of the casing 28.

Arranged directly beside the rod 3 and in parallel relationship thereto is a toothed rod or rack 25. The arresting means 14 comprising a locking pawl 26, a handle 34 and a release lever 39 co-operate with the rack 25. A spring 40 urges the locking pawl 26 into the rack 25 so that the holder device is arrested when the release lever 39 is released. For the purposes of releasing the arresting means, the lever 39 must be operated at the handle 34 so that the locking pawl 26 is released from the teeth of the rack 25, against the force of the spring 40. The lever 39 may in turn be locked with a flap member 41 in such a way that the locking pawl 26 remains out of engagement with the rack 25. It will be seen that that is a requirement for a motorized drive mode with the drive means 24. The flap member 41 is only secured by the force of the spring 40. When the lever 39 is gripped, the flap member 41 pivots away for example due to spring force and actuates a switching means (not shown) which uncouples the drive means 24. When the handle 34 is gripped therefore, the drive means is always uncoupled and cannot brake the cable drum.

In order to ensure that the drive means 24 cannot be actuated when the locking pawl 26 is in the engaged condition, the locking pawl is provided with a switching means 32 which is shown in FIG. 5a. The switching means 32 comprises a microswitch with a switching sensor 42 which interrupts the contact when the locking pawl 26 is in the engaged condition so that the drive means 24 cannot be activated. When the locking pawl 26 is retracted, the member 42 runs on a switching projection or cam 43 on the locking pawl and closes the contact at the switching means 32.

In order to prevent the casing 28 from rotating about the centre line of the rod 3, a guide member 27 is disposed in parallel relationship beside the rod 3. That form of lateral guide arrangement is substantially more advantageous than providing a guidance action at the rod itself. On the one hand, if a longitudinal guide means were to be provided at the rod itself, relatively high forces would occur due to the small lever arm involved, while on the other hand the form of mounting on the rod 3 would be considerably more difficult as the rod 3 would have to be provided with at least one longitudinal groove. A relatively long lever arm is formed between the centre line of the guide member 27 and that of the rod 3 so that rotary moments can only exert low forces at the guide rod. The guidance action at the guide member 27 is provided by means of adjustable guide sleeves or bushes 44 of plastics material, which have a flat front face so that there is a low degree of friction in regard to contact with the guide member. The bushes or sleeves 44 are shown in FIG. 6.

Figure 6:
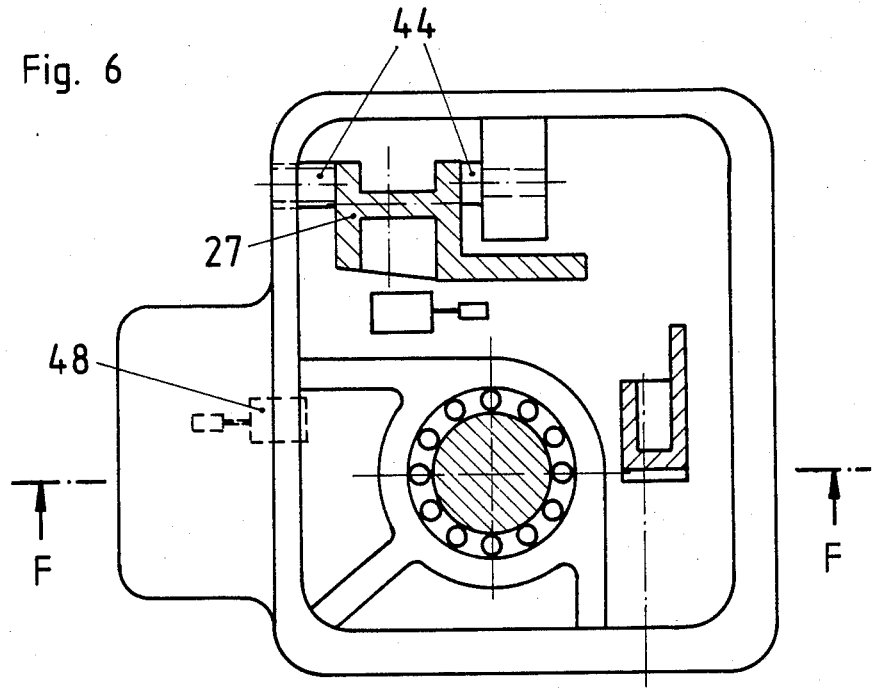
FIG. 6 shows a further view in cross-section through the holder device with the rod of the support and the guide rod, taken along line D—D in FIG. 1.
Figure 7:
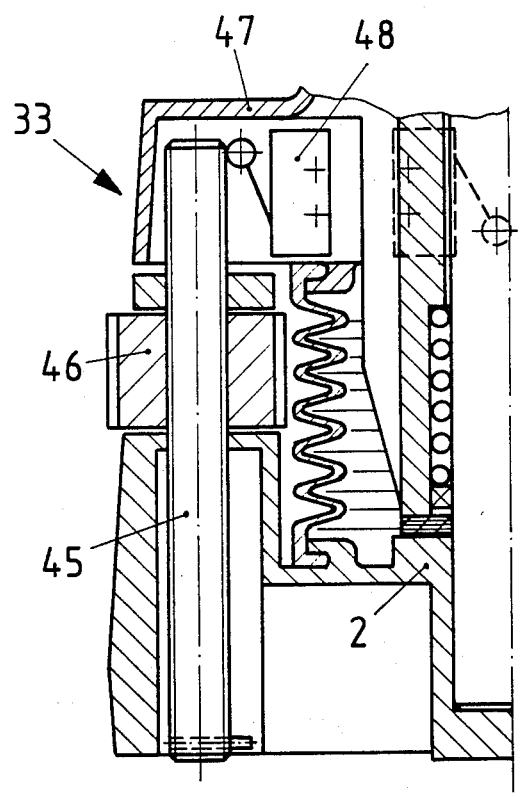
FIG. 7 shows a view in longitudinal section through the position switch taken along line F—F in FIG. 6.

FIGS. 6 and 7 show an adjustable position switch 33 with which the lower limit position of the casing can be defined. The position switch 33 comprises a limiting pin 45, the relative position of which with respect to the housing 2 can be adjusted with an adjusting wheel 46. In the manual mode of operation, with the casing 28 in the lower limit position, an abutment 47 bears against the pin 45. If the support is actuated by the motor means, a microswitch 48 interrupts the drive when the lower limit position is reached. In a similar manner, the upper limit position may be defined by means of a microswitch, in which respect it is possible for both functions to be combined in the position switch 33.

Figure 8:
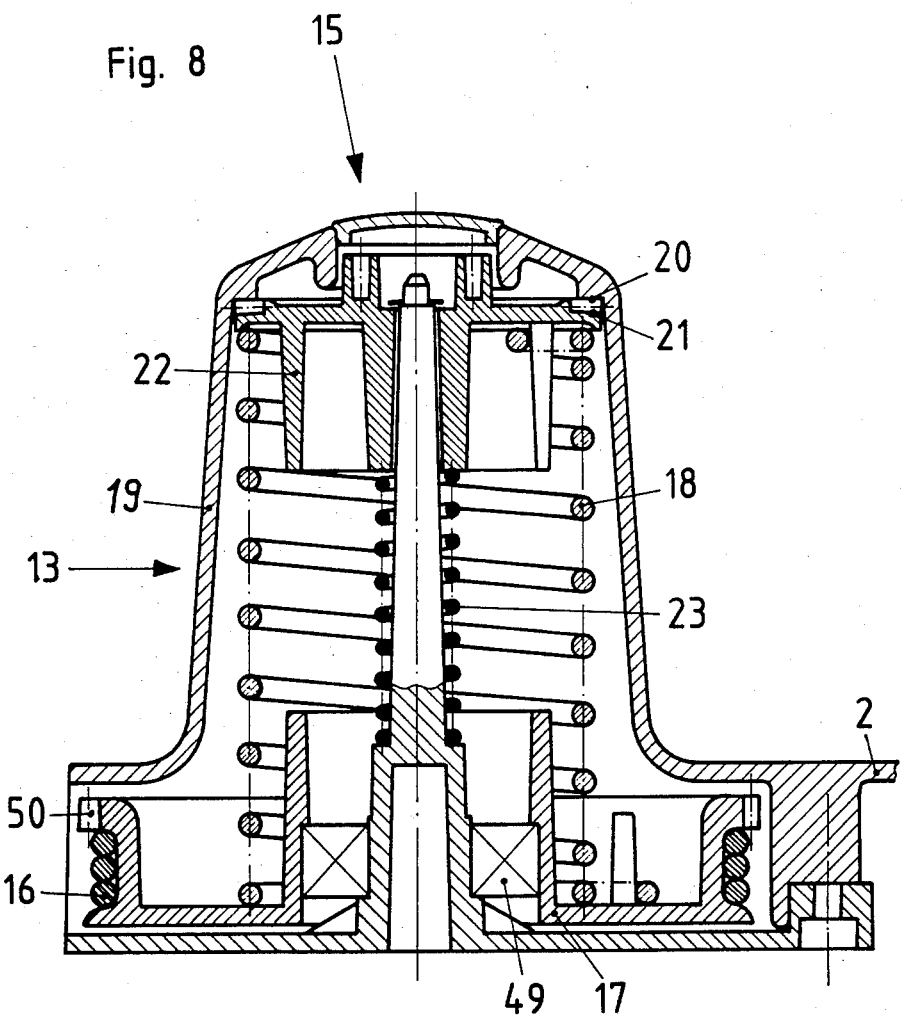
FIG. 8 is a view of longitudinal section through the spring means with the cable drum.

The mode of operation of the energy storage means 13 will now be described with reference to FIG. 8. A coil spring 18 is disposed in an upwardly closed, substantially cylindrical housing 19. The coil spring 18 is a leg-type spring, one leg being fixedly clamped to an adjusting means 15 and the other leg being connected to the cable drum 17. The cable drum 17 is mounted in the base plate 2 by a ball bearing assembly 49. The adjusting means 15 for prestressing the coil spring 18 comprises a spring plate 22. The spring plate 22 is urged against the teeth or serrations 20 on the inside of the housing, by a control means 23 in the form of a compression spring. The spring plate 22 in turn has a corresponding tooth or serration arrangement 21. When the control means 23 is tensioned, the spring plate 22 cannot therefore rotate relative to the housing. For the purposes of prestressing the coil spring 18, the control means 23 must be urged downwardly until the two tooth arrangements 20 and 21 come out of engagement with each other. The spring plate 22 can then be rotated so that the prestressing of the coil spring can be altered.

The choice of the appropriate form of coil spring with the desired spring characteristic is an aspect which is known to the man skilled in the art and is therefore not described in greater detail herein. In a similar manner as with regard to the coil spring, the cable drum could also be connected to a spiral spring. At any event, the springs must be of such sizes that the spring force and spring travel are sufficient to move the largest glass unit which can be held at the holder device from the lowermost limit position into the uppermost limit position. In addition, consideration must also be given to the time in which that movement must take place.

The cable 16 is wound on the cable drum 17. Depending on the periphery of the cable drum, two or three turns are sufficient for the cable to be wound on when the holder device is in the fully raised position. The cable drum is provided with a toothed rim portion as indicated at 50 which co-operates with the drive means 24 or the transmission means thereof, as shown by way of indication in FIG. 2.

The run of the cable 16 is shown in FIG. 5. Although it cannot be seen from the outside, the cable goes from the cable drum in the interior of the base plate and in the plane thereof, firstly to a first direction-changing roller 51 beneath the casing 28. From there the cable runs inside the concertina member 30 and within the casing 28 upwardly to a second direction-changing roller 31 which is disposed in the upper region of the rack 25. From the roller 31, the cable runs down again where it is secured to the case 36 at a clamping location 52. The cable ensures precise and reliable transmission of force from the energy storage means to the holder device. As the cable is a flexible member, an additional advantage is that, if necessary, even when the drive means 24 is in the operatively coupled condition, the holder device can be moved upwardly by hand. In addition, that also excludes the danger of an accident occurring during the downward movement of the holder device as it is only the weight of the holder device itself which acts in the direction of downward movement.

The drive means 24 is preferably disposed in a structural unit which can be connected to the housing 2 with a small number of operations. The user can thus selectively connect the drive means to the support, or not. Manual operation of the support is possible even when the drive means 24 is connected thereto, by the position of the flap member 41 on the handle 34 being sensed by means of a switch. If the flap member 41 is in the engaged condition and the blocking pawl is constantly in the released position, a coupling means between the drive means 24 and the cable drum can be automatically actuated. If on the other hand the handle 34 is gripped and the release lever 39 is pressed entirely inwardly at the handle 34, the flap member 41 swings out due to spring force and actuates a switch which automatically uncouples the drive means 24. In that way, it is possible at any time to intervene manually in the motorized operation of the support, without the drive means on the cable drum blocking manual operation. The available switching functions are summarized in the Table set out below:

|  | Manual Mode | Motorized Mode |
| --- | --- | --- |
| Locking pawl 26 | disengaged, drive means can be switched on | disengaged, drive means can be switched on |
| Release lever 39 | actuated but not arrested | actuated and arrested with the flap member |
| Flap member 41 | pivoted out | pivoted in for arresting the release lever |
| Drive means 24 | uncoupled | coupled |

The support according to the invention also includes an electronic control device having various parameters, which can control not only the stroke movement of the support but also the rotary movement of the drive unit and the supply of heat in the heating bath. In that way, entire operating procedures can be controlled for a fully automatic mode of operation, by the evaporator flask for example being immersed in the heating bath at a given temperature for a given time at a given speed of rotation and automatically lifted out of the heating bath after the expiry of the above-indicated period of time, whereafter all drive devices are automatically shut down.

The apparatus is extremely simple to handle and there is virtually no possibility of errors and defects in operating the apparatus. After the filled glass set has been fitted into the holder device 10, the required force potential is set at the energy storage means 13 by the adjusting means 15. In that connection, care is advantageously taken to ensure that the energy storage means is capable of lifting the evaporator flask entirely out of the heating bath when the arresting means 14 is released. The holder device is then lowered either by hand or by operation of the motor means so that the evaporator flask dips into the heating bath. During the downward movement, the cable 16 is unwound from the cable drum 17 and the spring means which is used as the energy storage means is put under tension. For the manual mode of operation, the handle 34 must be gripped and the release lever 39 actuated so that the locking pawl 26 comes out of engagement with the rod 25. When the arrangement is in the desired position, the handle 34 is released so that the lever 39 moves back into the rest position due to the spring force at the locking pawl, and the locking pawl moves into its position of engagement. For motorized operation, the release lever 39 must be secured by means of the flap member 41 so that the locking pawl remains in a disengaged position when the handle 34 is released. Motorized operation of the holder device 10 is then effected by pressing a suitable button or key on the control apparatus (not shown) which operates the drive means 24. At any time, it is possible to switch over automatically from the motorized mode to the manual mode by gripping the handle 34 and pressing the release lever entirely against the handle once again. When that is done, the flap member 41 automatically pivots outwardly so that the drive means 24 is uncoupled. If an unintentional interruption in power occurs while the apparatus is in the automatic mode, the drive means is also uncoupled so that the potential energy stored in the energy storage means 13 moves the holder device with the evaporator flask upwardly. The energy storage means also assists the upward movement of the holder device with glass unit and drive unit, in the manual mode of operation. In spite of the spring means being simultaneously put under tension in the energy storage means, downward movement of the holder device does not require a large amount of force to be applied, as the weight of the holder device assists in tensioning the spring means.

I claim:

1. An adjustable-height support for a weight, such as a combined glass unit and drive unit in an evaporator, the support comprising a base plate, a substantially vertical rod extending upwards from said base plate, a holder device for the weight displaceable along said rod, mechanical energy storage means for storing potential energy in an amount dependent on the position of said holder device along said rod, means mechanically operable between said holder device and said energy storage means whereby movement of said holder device downwards along said rod stores energy in said energy storage means, and whereby said holder device can be raised with the assistance of force derived from said energy storage means, locking means for locking said holder device against movement along said rod when said holder device is in any one of a range of positions along said rod, and adjusting means for adjusting the potential energy that can be stored in said energy storage means.

2. An adjustable-height support according to claim 1, in which said mechanical energy storage means is a spring device located on one side of said rod and wherein said spring device comprises a spring in which energy is stored by straining said spring.

3. An adjustable-height support according to claim 2, in which said mechanically operable means comprises a cable connected at one end thereof to said spring device, an anchor fixed with respect to said base for the other end of said cable and a guide for said cable mounted on said holder device whereby tension in said cable exerts a downward force on said holder device.

4. An adjustable-height support according to claim 2, in which said spring device comprises a cable drum and a fixed anchor point for said spring, said spring being strained between said anchor point and said drum to exert a turning moment on said drum, and said mechanically operable means including a cable wound on said drum and mounted to exert a downward force on said holder device dependent on the strain in said spring.

5. An adjustable height-support according to claim 2, in which said spring is a coil spring.

6. An adjustable-height support according to claim 2, in which said spring device comprises a cable drum, said spring being a coil spring with its ends connected respectively to said cable drum and to said adjusting means to exert a turning moment on said drum, and said mechanically operable means including a cable wound on said drum and mounted to exert a downward force on said holder device dependent on the strain in said spring.

7. An adjustable-height support according to claim 2, in which said spring device comprises a cable drum, said spring being a coil spring with its ends connected respectively to said cable drum and to said adjusting means, the support further including a housing covering said spring device and formed internally with a first tooth arrangement at one end of said coil spring, said adjusting means including a plate fixed to said coil spring and formed with a second tooth arrangement corresponding to said first tooth arrangement and pressed by said coil spring against said first tooth arrangement whereby the strain in said coil spring is adjustable according to the relative positions of said two tooth arrangements, a cable, included in said mechanically operable means, being wound on said drum and mounted to exert a downward force on said holder device dependent on the strain in said spring.

8. An adjustable-height support according to claim 2, in which said spring device comprises a cable drum and a fixed anchor point for said spring, said spring being strained between said anchor point and said drum to exert a turning moment on said drum, the support further including motorised drive means for said drum and means rsponsive to the operation of said locking means for disabling said motorised drive means when said holder device is locked against movement along said rod, said mechanically operable means including a cable wound on said drum and mounted to exert a downward force on said holder device dependent on the strain in said spring.

9. An adjustable-height support according to claim 1, in which said locking means include a rack fixed in parallel to said rod, a pawl mounted on said holder device for engaging said rack to prevent movement of said holder device along said rod, and manually controllable means on said holder device for withdrawing said pawl and causing the engagement of said pawl with said rack.

10. An adjustable-height support according to claim 1, comprising a guide member fixed parallel with said rod, said holder device including bearing means that travel along said guide member when said holder device moves along said rod and resist rotary moments acting on said holder device about the axis of said rod.

11. An adjustable-height support according to claim 1, in which said locking means include a rack fixed in parallel to said rod, a pawl mounted on said holder device for engaging said rack to prevent movement on said holder device along said rod, and manually controllable means on said holder device for withdrawing said pawl and causing the engagement of said pawl with said rack, said support further comprising a guide member fixed parallel with said rod, said holder device including bearing means that travel along said guide member when said holder device moves along said rod and resist rotary moments acting on said holder device about the axis of said rod, and said holder device including a casing enclosing said rod, said rack and said guide-member, said casing including a rigid portion and a concertina-like member connecting the lower end of said rigid portion to said base.

* * * * *